United States Patent Office 3,282,409
Patented Nov. 1, 1966

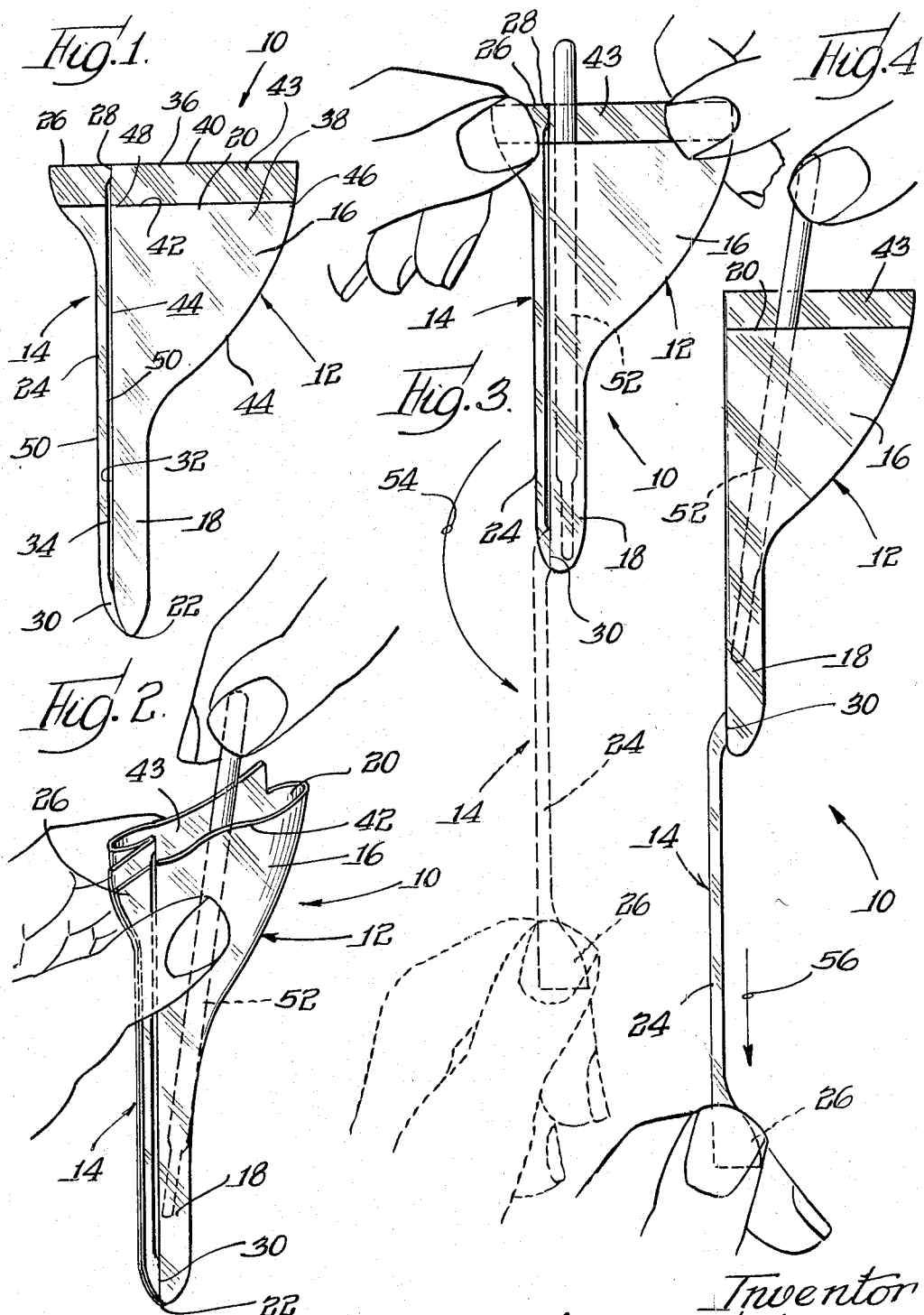

3,282,409
QUICK RELEASABLE THERMOMETER SHEATH
Walter E. Hidding, 505 Banbury Road, Addison, Ill.
Filed Dec. 7, 1964, Ser. No. 416,560
8 Claims. (Cl. 206—16.5)

This invention relates generally to the medical arts and especially to disposable sheaths for clinical thermometers.

In the past, various types of protective covers have been devised in an effort to prevent a clinical thermometer from communicating disease germs among a group of patients who share the use of the thermometer. The disposable sheath or cover has proved particularly advantageous. However, sheaths of this latter type tend to cling to the thermometer making unsheathing difficult. There has been a corresponding tendency to spread germs to the fingers of the doctor or nurse utilizing the thermometer because of the temptation to grasp the end of the sheath fresh from the patient's mouth in order to effect a quick separation of sheath and thermometer.

Therefore, an important object of the present invention is to provide a disposable sheath that is arranged for separation from an enclosed thermometer in a completely sanitary manner.

A more general object of the invention is to provide a new and improved disposable thermometer sheath.

Another object of the invention is to provide a thermometer sheath of the disposable type which is convenient to use and easy to separate from an enclosed thermometer.

These and other objects and features of the invention will become more apparent from a consideration of the following descriptions.

A thermometer sheath in accord with the invention includes a thermometer-receiving member defining an open end and a closed end opposite the open end. A handle member is securely connected to the thermometer-receiving member adjacent the closed end and weakly connected thereto adjacent the open end. The closed end of the thermometer-receiving member and the secure connection are arranged to be exposed to the contaminated environment of a patient's mouth, and the open end and the weak connection are adapted to be separable from such an environment. Thus, the handle member may be grasped adjacent the weak connection to be pulled away from the open end rupturing the weak connection. Thereafter, the handle member may be swung away from the open end and into generally longitudinal alignment with the thermometer-receiving member for use in unsheathing a thermometer without exposing the fingers of the person manipulating the sheath to those parts of the sheath which have been exposed to the contaminated environment.

The invention, both as to its construction and as to its mode of usage, will be better understood by reference to the following disclosure and drawing forming a part thereof wherein:

FIG. 1 is a side elevational view of a thermometer sheath constructed in compliance with the principles of the invention;

FIG. 2 is a perspective view illustrating manipulation of the sheath of FIG. 1 to permit insertion of a clinical thermometer;

FIG. 3 is a side elevational view showing separation of one end of the handle member of the sheath of FIG. 1 to permit sanitary separation of the sheath from an enclosed thermometer; and FIG. 4 is a view similar to the broken line showing of FIG. 3 but illustrating actual separation of the sheath from the thermometer.

Referring now in detail to the drawing, specifically to FIG. 1, a thermometer sheath indicated generally by the numeral 10 will be seen to include a thermometer-receiving member 12 and a handle member 14. The thermometer-receiving member 12 includes a funnel-shaped bell or mouth portion 16 and a tubular boot portion 18. The mouth portion 16 defines an open end 20, and the boot portion 18 is coadunately connected to the mouth portion 16 forming therewith a thermometer-receiving case and defining a closed end 22 opposite the open end 20. The handle member 14 includes an elongated body portion 24, a tab portion 26, a relatively weak connection 28 and a relatively strong or secure connection 30. In the illustrated embodiment, the mouth portion 16 and the boot portion 18 of the thermometer-receiving member 12 share a common straight lateral side or edge 32; and the handle member 14 is advantageously disposed parallel with this edge.

In compliance with the features of the present invention, the weak connection 28 joins the tab portion 26 of the handle member 14 with the thermometer-receiving member 12 adjacent the open end 20; and the secure connection 30 couples the handle member 14 to the thermometer-receiving member 12 adjacent the closed end 22. Furthermore, an elongated, narrow slot or open region 34 separates the weak connection 28 and the secure connection 30. Alternatively, the open region 34 may be replaced by a relatively weak connection of the same length.

The thermometer sheath 10 is advantageously fabricated from relatively thin flexible plastic film having appreciable translucency of transparency. So fabricated, the sheath 10 permits accurate reading of a thermometer contained within it while offering a minimal barrier to the transfer of heat from the tissues of the patient's mouth to the thermometer. Comparatively thin films are also consonant with the disposable character of the sheath, and it has been found that opening of the sheath preparatory to insertion of a clinical thermometer is facilitated by selecting the material of the sheath to be one which possesses a low coefficient of friction. With the sheath so fabricated, the adjacent walls of the mouth portion 16 may readily slip past each other to present an opening for receiving a thermometer. Polyolefinic films, such as polyethylene, have proved eminently useful in producing the thermometer sheath 10.

In addition, the material for the thermometer sheath is selected to be thermoplastic in order that the sheath may be made from flat films using appropriately shaped fusion joints. Therefore, the sheath 10 is advantageously fabricated from a first film or leaf 36 and a second such film or leaf 38, leaf 38 being disposed in overlying relationship with the leaf 36. The leaves 36 and 38 are provided with corresponding straight edges 40 and 42 respectively, and these edges are selectively misregistered to define an apron 43 and the open end 20. With the leaves 36 and 38 so positioned and with the leaves appropriately supported, a fusion joint or seam 44 is traced in a generally looped path between spaced points 46 and 48 along the mouth 20 whereby to joint the leaves away from the mouth forming the thermometer-receiving member 12. The fusion joint 44 is conveniently made by conventional heat sealing methods employing an electrically heated wire or knife of appropriate shape.

The handle member 14 may also be developed by tracing a looped fusion joint or seam 50 in an appropriate path around its perimeter. Similarly, the connections 28 and 30 may be made by relatively deep and relatively shallow penetration respectively of the heat sealing wire; and the slot 34 may be fashioned by causing the heat sealing wire to cut through both of the leaves 36 and 38. If desired, the entire area of the handle member 14 may be heat sealed to join the leaves 36 and 38 in this area, rather than merely forming the peripheral fusion seam 50. Having thus described the construction of the illustrated embodiment, it will be valuable now to describe how it is used. Assuming that it is desired to take a patient's temperature, the sheath 10 will be grasped at the upper end of the mouth portion 16 between the thumb and fingers of the left hand as is shown in FIG. 2. A relative rubbing action will cause the mouth portion to blouse or billow forming a well defined entrance at the open end 20 for ready admission of a clinical thermometer 52. The apron 43 serves to lead the advancing end of the thermometer 52 into the entrance defined at the open end 20. The lower end of the mouth portion 16 and the boot portion 18 need not be touched in this operation. Thereupon, the mouth portion 16 will be twisted about the upper end of the thermometer and the assemblage inserted part way into the patient's mouth.

After the assembled sheath and thermometer have been withdrawn and the temperature noted, all handling of the assemblage being done at the dry or uninserted upper end of the mouth portion 16, it will be desired to separate the thermometer and the sheath for disposal of the sheath. Withdrawal of the thermometer 52 from the sheath 10 will be apparent from an examination of FIGS. 3 and 4; and considering FIG. 3 first, it will be seen that the sheath 10 is to be grasped at its upper regions between the thumb and fingers of the left and right hands as is indicated in solid outline, the left hand grasping the tab portion 26 of handle member 14 and the right hand grasping the opposite upper corner of the sheath. Next, the hands will be pulled apart to rupture the weak connection 28 releasing the upper end of the handle member 14 from the mouth portion 16. With the upper end of the handle member 14 free from the mouth portion 16, the handle member 14 will be swung in an arc indicated generally by the numeral 54 and into longitudinal alignment with the member 12, i.e. from the position shown in solid outline to the position shown in broken outline. Thus, the handle member 14 will be directed in a generally swinging-type of movement with the secure connection 30 acting much like a hinge, at least insofar as it defines a pivot for the handle member. When the handle member is positioned as is shown in broken outline, it will be susceptible of use as a pulling tool.

With the handle member 14 in the position shown in FIG. 4, the left hand will be pulled relatively away from the right hand in the direction of arrow 56 while the right hand grasps the thermometer 52. This action will serve to separate the sheath 10 from the thermometer. Considering the patient's mouth as a contaminated environment, as it would be in the situation of a patient infected with a virulent disease, the closed boot portion 18 together with the adjacent regions of the mouth portion 16 and the secure connection 30 will be, of course, exposed to that environment upon insertion of the assembled sheath and thermometer into the patient's mouth. It will be recognized, on the other hand, that the tab portion 26, the apron 43 and the upper regions of the mouth portion 16 adjacent the open end 20 will not be so exposed to the contaminated environment by virtue of the fact that they are not inserted in the patient's mouth. Accordingly, the tab portion 26, the apron 43 and the regions of the mouth portion 16 adjacent the open end 20 may be safely touched by the doctor or nurse utilizing the thermometer without exposing the fingers to contamination. Removal of the entire sheath from the thermometer, in the manner described, precludes contaminating the user's fingers as well as the thermometer and thus provides a sanitary procedure for taking a patient's temperature.

The specific example herein shown and described is to be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. A disposable thermometer sheath comprising: a thermometer-receiving member having an open end and a closed end opposite said open end; and a handle member including relatively strong connection means securely coupling said handle member to said thermometer-receiving member adjacent said closed end, a graspable portion normally disposed adjacent said open end and relatively weak connection means between said handle member and said thermometer-receiving member away from said relatively strong connection means, said closed end and said relatively strong connection means being exposable to a contaminated environment and said open end and said graspable portion being separable from said environment, whereby said portion may be grasped by a person's fingers and pulled away from said open end to rupture said relatively weak connection means and to permit relocation of said portion to a position away from said open end for use in unsheathing a thermometer without exposing the fingers to contamination.

2. A disposable thermometer sheath comprising: a thermometer-receiving member having an open end and a closed end opposite said open end; and a handle member including relatively strong hinge connection means swingably and securely coupling said handle member to said thermometer-receiving member adjacent said closed end, a graspable portion normally disposed adjacent said open end, and relatively weak connection means between said thermometer-receiving member and said handle member away from said relatively strong hinge connection means, said closed end and said relatively strong hinge connection means being exposable to a contaminated environment and said open end and said graspable portion being separable from said enviroment, whereby said portion may be grasped by a person's fingers and pulled away from said open end to rupture said relatively weak connection means and to permit swinging of said portion away from said open end for use in unsheathing a thermometer without exposing the fingers to contamination.

3. A disposable thermometer sheath comprising: a thermometer-receiving member having an open end and a closed end opposite said open end; and a flexible handle member including relatively strong connection means securely coupling said handle member to said thermometer-receiving member adjacent said closed end, a graspable portion normally disposed adjacent said open end, relatively weak connection means between said thermometer-receiving member and said handle member at said graspable portion, and slot means intermediate said connection means, said closed end and said relatively strong connection means being exposable to a contaminated environment and said open end and said graspable portion being separable from said environment, whereby said portion may be grasped by a person's fingers and pulled from said open end to rupture said relatively weak connection means and to permit relocation of said portion to a position away from said open end for use in unsheathing a thermometer without exposing the fingers to contamination.

4. A disposable thermometer sheath comprising: a thermometer-receiving member including a mouth portion defining an open end and including a boot portion connected to said mouth portion forming a thermometer-receiving case and defining a closed end opposite said open end; and a handle member including relatively strong connection means securely coupling said handle member to said thermometer-receiving member at said boot portion, a graspable portion normally disposed adjacent said mouth portion, and relatively weak connection means between said thermometer-receiving member and said handle member away from said relatively strong connection means, said boot portion and said relatively strong connection means being exposable to a contaminated environment and at least the upper region of said mouth portion and said graspable portion being separable from said environment whereby said graspable portion may be gripped by a person's fingers and pulled away from said mouth portion to rupture said relatively weak connection means and to permit relocation of said graspable portion to a position away from said open end for use in unsheathing a thermometer without exposing the fingers to contamination.

5. A disposable thermometer sheath comprising: a thermometer-receiving member including a funnel-shaped mouth portion defining an open end and including a tubular boot portion connected to said mouth portion forming a thermometer-receiving case and defining a closed end opposite said open end; and a handle member including relatively strong connection means securely coupling said handle member to said thermometer-receiving member adjacent said boot portion, a graspable portion normally disposed adjacent said mouth portion, and relatively weak connection means between said thermometer-receiving member and said handle member away from said relatively strong connection means, said boot portion and said relatively strong connection means being exposable to a contaminated environment and at least the upper region of said mouth portion and said graspable portion being separable from said environment, whereby said graspable portion may be gripped by a person's fingers and pulled away from said mouth portion to rupture said relatively weak connection means and to permit relocation of said graspable portion to a position away from said open end for use in unsheathing a thermometer without exposing the fingers to contamination.

6. A disposable thermometer sheath comprising: a pair of overlyingly disposed, flexible, thermoplastic resinous leaves, corresponding edges of said leaves defining a mouth; and fusion joint means tracing a generally looped path between spaced points along said mouth and joining said leaves away from said mouth whereby to define a tubular boot, a funnel-shaped portion between said mouth and said boot, and a handle relatively weakly connected to a said leaf at a corner of said mouth and relatively securely connected to said boot, whereby said handle may be grasped by a person's fingers and pulled from said funnel-shaped portion to rupture the relatively weak connection and to permit relocation of the thus released end of the handle to a position away from said mouth for use in unsheathing a thermometer received in said sheath without exposing the fingers to contact with said tubular boot or that portion of the handle adjacent said boot at the relatively secure connection.

7. A disposable thermometer sheath comprising: a pair of overlyingly disposed, flexible, thermoplastic resinous leaves, corresponding straight edges of said leaves being selectively misregistered to define a mouth; and fusion joint means tracing a generally looped path between spaced points along said mouth and joining said leaves away from said mouth whereby to define a tubular boot, a funnel-shaped portion between said mouth and said boot, and a handle relatively weakly connected to a said leaf at a corner of said mouth and relatively securely connected to said boot, said handle being free between said connections, whereby said handle may be grasped by a person's fingers and pulled away from said funnel-shaped portion to rupture the relatively weak connection and to permit relocation of the thus released end of the handle to a position away from said mouth for use in unsheathing a thermometer received in said sheath without exposing the fingers to contact with said tubular boot or that portion of the handle adjacent said boot at the relatively secure connection.

8. A disposable thermometer sheath comprising: a pair of overlyingly disposed, flexible, thermoplastic resinous leaves, corresponding edges of said leaves defining a mouth; and fusion joint means tracing a generally looped path between spaced points along said mouth and joining said leaves away from said mouth whereby to define a tubular boot, a funnel-shaped portion between said mouth and said boot, and a handle relatively weakly connected to a said leaf at a corner of said mouth and relatively securely connected to said boot, said fusion joint means defining a common straight lateral side for said funnel-shaped portion and said boot, said handle being aligned parallel with said straight side, whereby said handle may be grasped by a person's fingers and pulled from said funnel-shaped portion to rupture the relatively weak connection and to permit relocation of the thus released end of the handle to a position away from said mouth for use in unsheathing a thermometer received in said sheath without exposing the fingers to contact with said tubular boot or that portion of the handle adjacent said boot at the relatively secure connection.

References Cited by the Examiner

UNITED STATES PATENTS

| | | | |
|---|---|---|---|
| 194,170 | 8/1877 | Pope | 229—66 |
| 1,672,884 | 6/1928 | Gingras. | |
| 1,949,121 | 2/1934 | Herder | 229—51 |
| 2,261,466 | 11/1941 | Habib | 229—87 |
| 2,480,416 | 8/1949 | Modes | 206—62 |
| 2,910,174 | 10/1959 | Reid | 206—16.5 |
| 2,969,141 | 1/1961 | Katzin | 206—16.5 |

FOREIGN PATENTS 516,253   9/1955   Canada.

THERON E. CONDON, *Primary Examiner.*

J. M. CASKIE, *Assistant Examiner.*